United States Patent
Adhikesavalu et al.

(10) Patent No.: US 9,549,230 B2
(45) Date of Patent: Jan. 17, 2017

(54) OPTICS DEVICE PORT CONFIGURATION SYSTEM

(71) Applicant: Dell Products L.P., Round Rock, TX (US)

(72) Inventors: Kapil Adhikesavalu, TamilNadu (IN); Satish Jayavel, TamilNadu (IN)

(73) Assignee: Dell Products L.P., Round Rock, TX (US)

( * ) Notice: Subject to any disclaimer, the term of this patent is extended or adjusted under 35 U.S.C. 154(b) by 282 days.

(21) Appl. No.: 14/505,195

(22) Filed: Oct. 2, 2014

(65) Prior Publication Data

US 2016/0100234 A1    Apr. 7, 2016

(51) Int. Cl.
*H04Q 11/00*       (2006.01)
(52) U.S. Cl.
CPC ................... *H04Q 11/0003* (2013.01)
(58) Field of Classification Search
CPC ........... H04Q 11/0005; H04Q 2011/0039; H04Q 11/0062; H04Q 2011/0052; H04Q 2011/0015; H04Q 11/0003
See application file for complete search history.

(56) References Cited

U.S. PATENT DOCUMENTS

| 5,583,856 A * | 12/1996 | Weir ................. H04Q 11/0407 370/359 |
| RE37,125 E * | 4/2001 | Carlson ................. H04Q 1/028 379/413.02 |
| 2007/0153726 A1* | 7/2007 | Bar-Sade .............. H04L 1/0002 370/329 |

* cited by examiner

*Primary Examiner* — Ted Wang
(74) *Attorney, Agent, or Firm* — Haynes and Boone, LLP (57) ABSTRACT

An optics device port configuration system includes a switch. A first optics device and a second optics device are connected to the switch. A cable connects the first optics device and the second optics device to provide a link. The switch determines that an optics type of the first optics device is unavailable. In response, the switch applies each of a plurality of fiber optics configurations on the switch until either the link becomes available or each of the fiber optics configurations have been applied without the link becoming available. In response to each of the fiber optics configurations having been applied without the link becoming available, the switch applies each a plurality of copper optics configurations on the switch until the link becomes available. In response to the link becoming available, the switch provides at least one setting on the switch until errors are not occurring on the link.

20 Claims, 4 Drawing Sheets

OPTICS DEVICE PORT CONFIGURATION SYSTEM

BACKGROUND

The present disclosure relates generally to information handling systems, and more particularly to a configuration system for optics devices in an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, switch IHSs, utilize optics devices such as, for example, small form-factor pluggable (SFP) optics devices, enhanced SFP (SFP+) optics devices, and quad-SFP (QSFP) optics devices, that are compact, hot-pluggable transceivers that connect to ports on the switch IHS in order to provide for, for example, telecommunication and data communication applications. In general, the port on the switch IHS to which the optics device is connected is configured in order to work properly with its connected optics device without link issues or packet cyclic redundancy check (CRC) issues. Conventionally, the settings that allow the optics device to work properly (e.g., Software receive loss-of signal (SwRXLOS) settings, interface type settings, pre-emphasis settings, etc.) on the port of the switch IHS are retrieved by reading an optics type from an electronically erasable programmable read-only memory (EEPROM) in the optics device, and using that optics type to retrieve those settings for use in configuring the port. However, if an optics device with an EEPROM that has not been programmed or that has been corrupted is provided in the port of the switch IHS, link issues and packet CRC issues will typically result as, without the optics type from the EEPROM, the switch IHS will not be able to determine the correct settings to configure its port for that optics device. As such, optics devices with unprogrammed or corrupted EEPROMs are unusable and typically must be replaced.

Accordingly, it would be desirable to provide an improved optics device configuration system.

SUMMARY

According to one embodiment, an information handling system (IHS) includes a plurality of ports; a processing system that is coupled to the plurality of ports; a memory system that is coupled to the processing system and that includes instructions that, when executed by the processing system, cause the processing system to: detect a first optics device that is coupled to a first port of the plurality of ports and that provides a link between the first port and a second port of the plurality of ports; determine that an optics type of the first optics device is unavailable; apply each of a plurality of fiber optics configurations to the first port until either the link becomes available or each of the plurality of fiber optics configurations have been applied without the link becoming available; in response to each of the plurality of fiber optics configurations having been applied without the link becoming available, apply each a plurality of copper optics configurations to the first port until the link becomes available; and in response to the link becoming available, provide at least one setting on the first port until errors are not occurring on the link.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
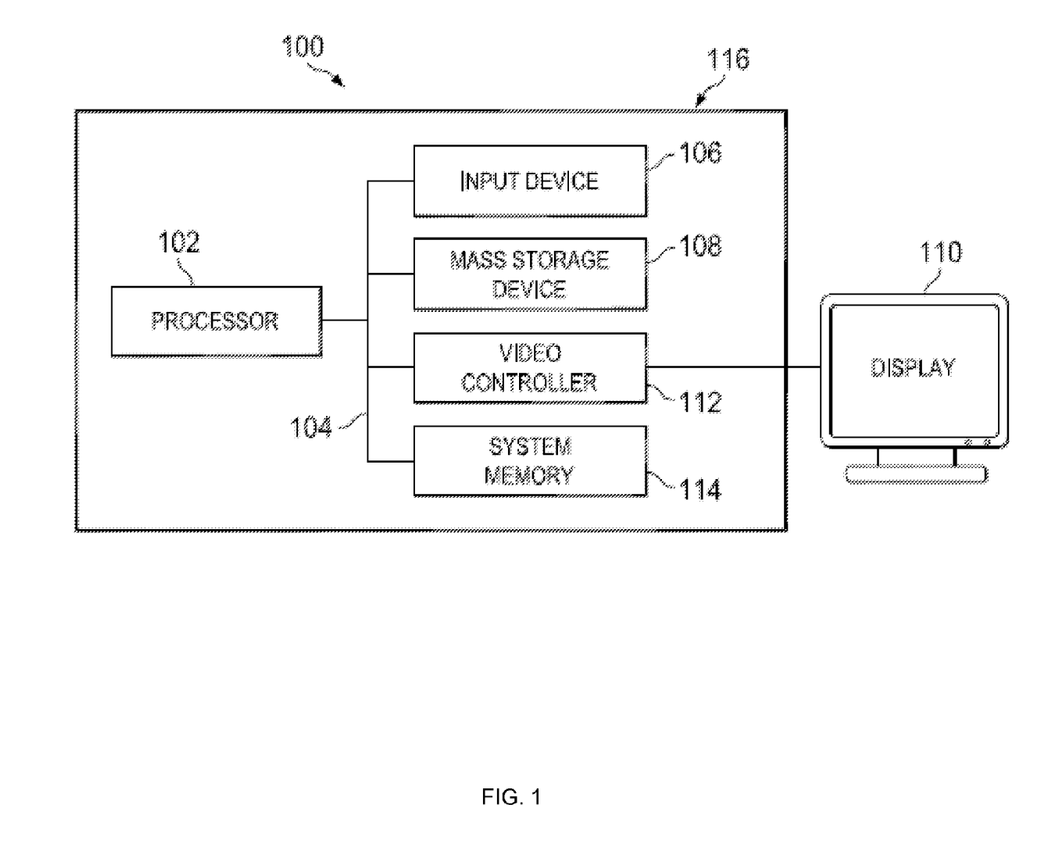
FIG. 1 is a schematic view illustrating an embodiment of an information handling system (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
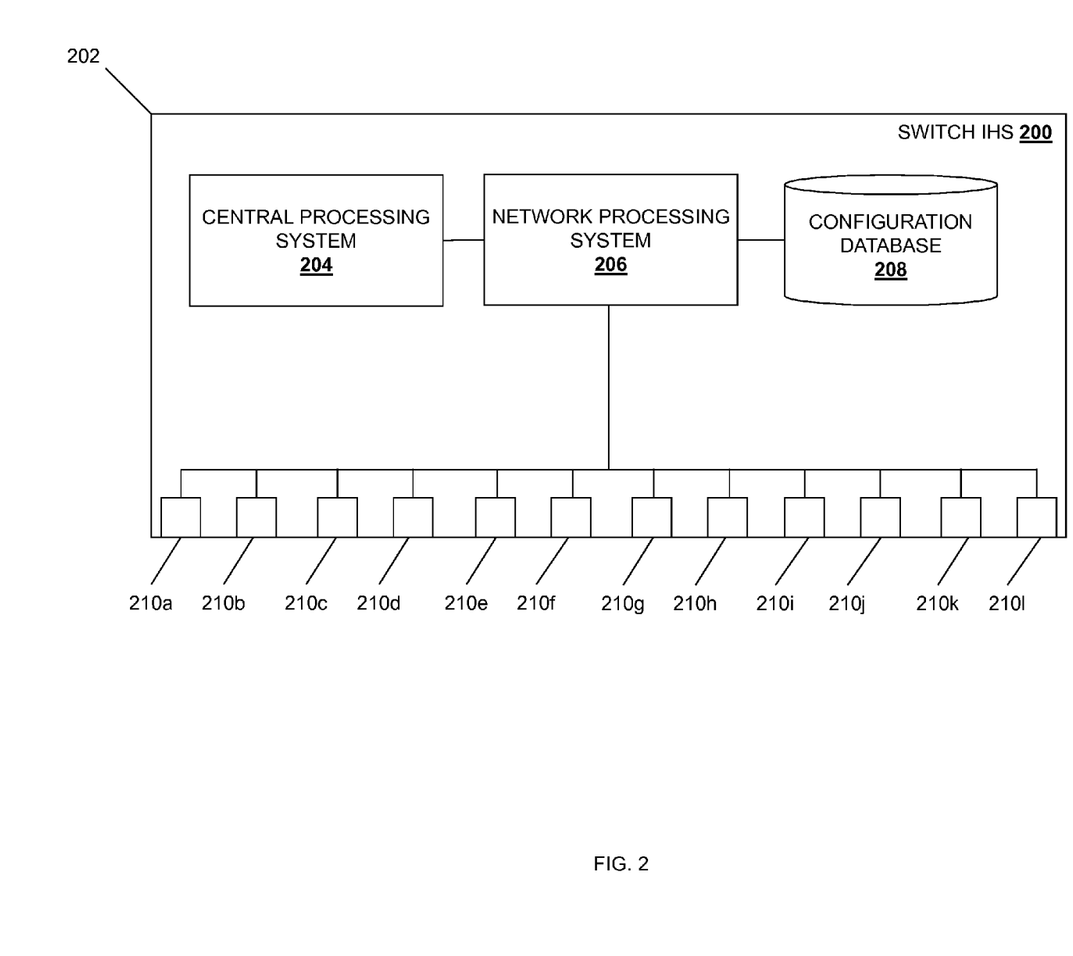
FIG. 2 is a schematic view illustrating an embodiment of a switch IHS.

Referring now to FIG. 2, an embodiment of a switch IHS 200 is illustrated. In an embodiment, the switch IHS 200 may be the IHS 100 discussed above with reference to FIG. 1, and/or may include some or all of the components of the IHS 100. The switch IHS 200 includes a switch IHS chassis 202 that houses the components of the switch IHS 200, which in the illustrated embodiment include a central processing system 204 (e.g., one or more central processing units (CPUs)), a network processing system 206 (e.g., one or more network processing units (NPUs)), and a configuration database 208. While a few components are illustrated, one of skill in the art will recognize that a variety of other components may be included in the switch IHS 200 while remaining within the scope of the present disclosure. For example, a memory system (not illustrated, but which may include one or more memory devices) may be included in the switch IHS chassis 202, coupled to the central processing system 204 and/or network processing system 206, and may include instructions that, when executed by the central processing system 204 and/or network processing system 206, cause the central processing system 204 and/or network processing system 206 to provide the functionality of the switch IHS 200 discussed below. In the illustrated embodiment, the network processing system 206 is coupled to each of the central processing system 204 and the configuration database 208, as well as to a plurality of ports 210a, 210b, 210c, 210d, 210e, 210f, 210g, 210h, 210i, 210j, 210k, and 210l that are partially housed in the switch IHS chassis 202 and accessible on an outer surface of the switch IHS chassis 202. However, the illustrated embodiment is merely provided as an example of a switch IHS according the teachings of the present disclosure, and one of skill in the art in possession of the present disclosure will recognize that a wide variety of connections and configurations of components in the switch IHS 200 will fall within the scope of the present disclosure.

In the embodiments discussed below with reference to FIG. 2, the central processing system 204 performs functions such as, for example, booting/initializing the network processing system 206 and processing control data traffic for the switch IHS 200, while the network processing system 206 performs functions such as, for example, the auto-configuration of any of the plurality of ports 210a-210l that are connected to an optics device as discussed below. However, one of skill in the art in possession of the present disclosure will recognize that the functionality of the central processing system 204 and the network processing system 206 may be switched, reallocated, combined, and/or otherwise modified while remaining within the scope of the present disclosure. Furthermore, the configuration database 208 is described below as a single database that is located in the switch IHS chassis 202 and that stores configurations and settings for automatically configuring any of the plurality of ports 210a-210l that are connected to an optics device, but one of skill in the art in possession of the present disclosure will recognize that any of the information discussed below as being stored in the configuration database 208 may be distributed across multiple databases and/or may be accessible by the switch IHS 200 over a network (i.e., stored on a device that is connected to the switch IHS 200 through the network).

Figure 3:
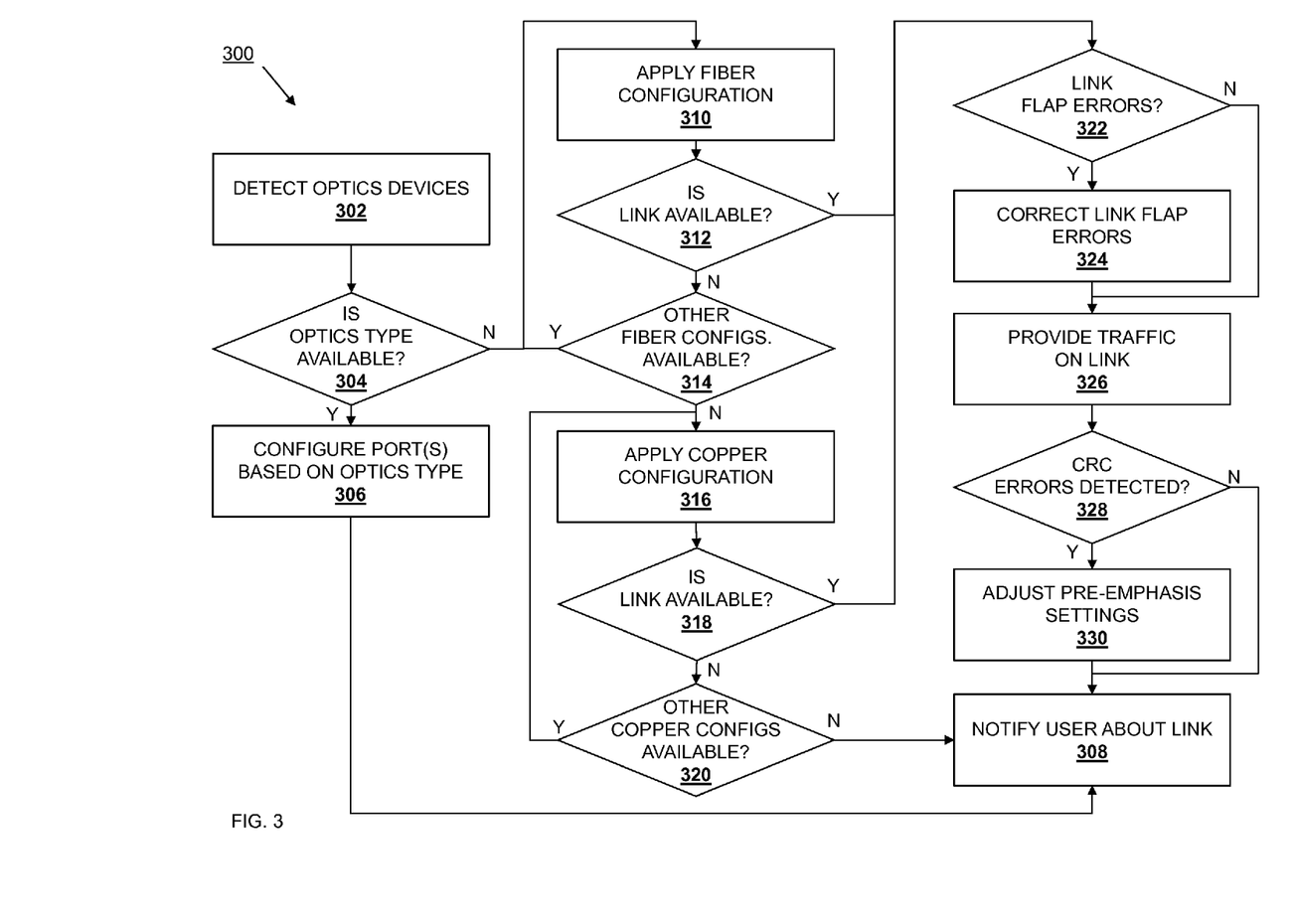
FIG. 3 is a flow chart illustrating an embodiment of a method for automatically providing a configuration for an optics device.

Referring now to FIG. 3, an embodiment of a method 300 for providing a configuration for an optics device is illustrated. As discussed above, conventional configuration systems for optics devices may involve reading information from an EEPROM (e.g., defined as per small form factor (SFF) industry standards SFF-8472 for SFP+ and SFF-8436 for QSFP+) in the optics devices that may include an optics type (e.g., a short range (SR4) optics type, an extended range (ER4) optics type, a long range (LR4) optics type, etc.). In addition, some optics devices may include a read-only customizable location in the EEPROM (e.g., a manufacturers proprietary ID section) in which optics manufacturers provide optics device operation parameters such as wavelength and distance values, and conventional configuration systems for such optics devices may include reading the wavelength and distance values from the manufacturers proprietary ID section to retrieve and/or determine the optics type. In such conventional configuration systems, if the manufacturers proprietary ID section is not present, the "optics type page 00 address 131" (according to the SFF-8436 industry standard for the EEPROM) may be read to retrieve the optics type.

As discussed above, if an optics device that includes an EEPROM that has not been programmed or that has been corrupted is provided in the port of the switch IHS, link issues and packet CRC issues will typically result as without the optics type from the EEPROM the switch IHS may not be able to determine the correct settings to configure its port for that optics device. Without the correct settings on the port, a link associated with the port may not become available, packet cyclic redundancy check (CRC) errors may occur, link flap errors may occur, and/or data packets may be lost. In a specific example, a long range optics device (e.g., utilizing LR4 optics devices) may require the supply of a relatively high power through its connected port in order to transmit data over a long range link, but the port settings may default to the provision of relatively low power to reduce power consumption of the switch IHS, and thus if no optics type is can be retrieved from the long range optics device then the system will not be able to provide a high power setting and as a result the link will not operate correctly.

As such, optics designers who create new optics devices without programmed EEPROMs have trouble testing those optics devices with conventional switch IHSs, and optics devices with corrupted EEPROMs must typically be discarded and replaced with optics devices that have programmed and uncorrupted EEPROMs. The method 300 describes the operation of a switch IHS (e.g., the switch IHS 200 discussed above with reference to FIG. 2) that functions to automatically configure a port that is connected to an optics device without any knowledge of the optics type of that optics device and, as such, optics devices with unprogrammed or corrupted EEPROMs may be used with that switch IHS.

Figure 4:
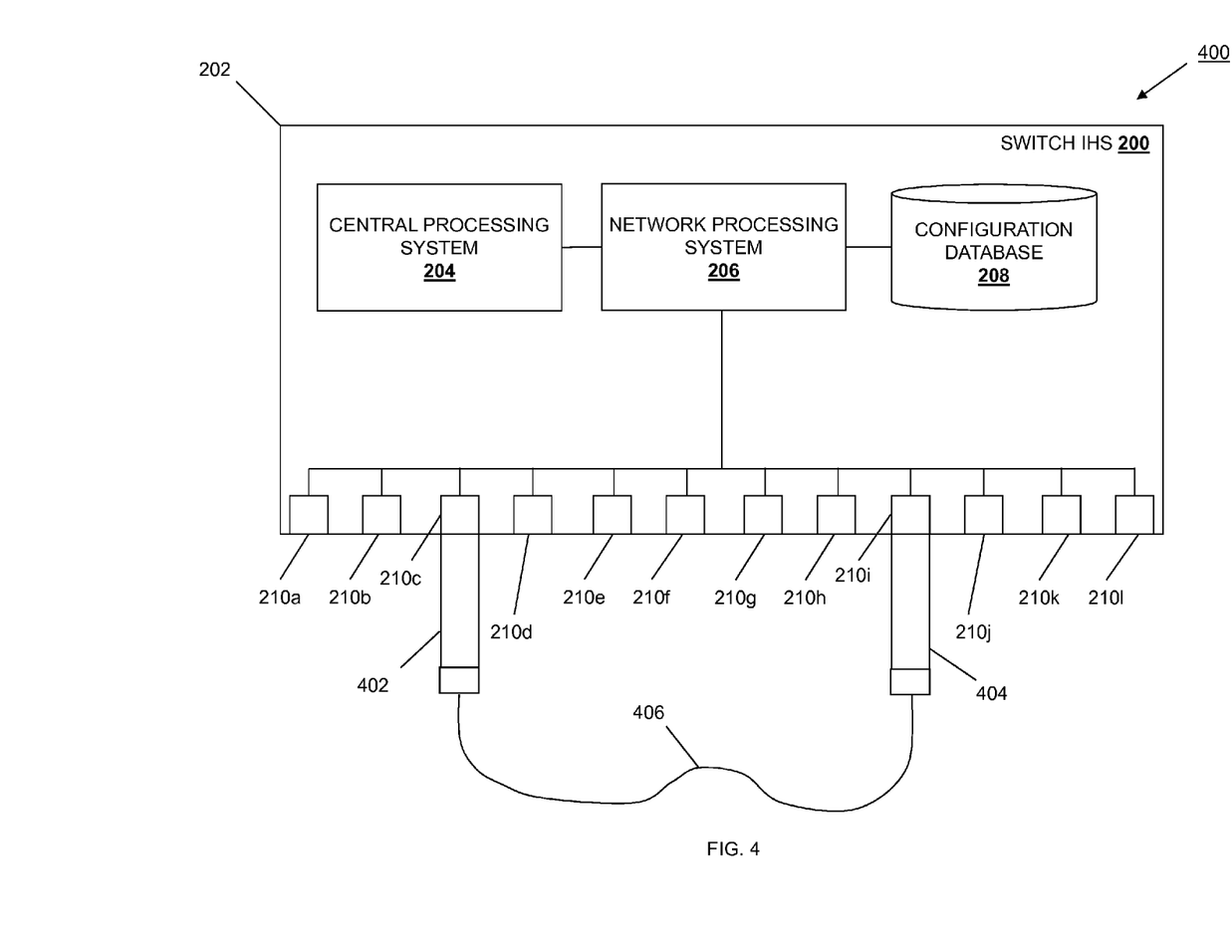
FIG. 4 is a schematic view illustrating an embodiment of optics devices coupled to the switch IHS of FIG. 2.

Referring now to FIGS. 3 and 4, the method 300 begins at block 302 where optics device are detected. FIG. 4 illustrates an optics device configuration system 400 that includes an optics device 402 coupled to the port 210c on the switch IHS 200 of FIG. 2, an optics device 404 coupled to the port 210i on the switch IHS 202, and a cable 406 coupled to each of the optics devices 402 and 404 to provide a link between the ports 210c and 210i on the switch IHS 200. The optics devices 402 and 404 have the same optics type. In some of the embodiments discussed below, the optics devices 402 and 404 are described as 40 Gbps fiber optics devices such as, for example, SR4 fiber optics devices, ER4 fiber optics devices, and LR4 fiber optics devices. However, the optics devices 402 and 404 may be variety of other fiber optics devices known in the art that operate at different ranges, different speeds, and/or that exhibit other optic device characteristics. In a specific example, the use of an extra-long range optics device such as a ZR optics device (rated for 80 kilometers) may require the use of an attenuator on the switch IHS 200 to ensure that the optics device at the other end of the link is not damaged due to the relatively high power used in operating the ZR optics device.

In some of the embodiments discussed below, the optics devices 402 and 404 are described as 40 Gbps copper optics devices such as, for example, for example, copper (CR4) direct attach cable (DAC) optics devices and CR4 DAC fanout optics devices. However, the optics devices 402 and 404 may be a variety of other copper optics devices known in the art that operate at different ranges, different speeds, and/or exhibit other optic device characteristics. While a few examples of fiber optics devices and copper optics devices have been provided, one of skill in the art in possession of the present disclosure will recognize that the teachings of the present disclosure will be beneficial to a wide variety of fiber optics devices and copper optics devices known in the art, and thus such optics devices will fall within its scope. The cable 406 that couples to each of the optics devices 402 and 404 to provide the link between the ports 210c and 210i may thus be a wide variety of fiber optics or copper optics compatible cables known in the art, and the selection of the type of the cable 406 will depend on the type of the optics devices 402 and 404.

While the optics device configuration system 400 is illustrated as including a single optics device 402 connected to another single optics device 404 by the cable 406, other types of optics device systems will fall within the scope of the present disclosure. In an embodiment, the optics device 402 may be included on first end of a breakout/fanout cabling system that has a plurality of optics devices 404 located on a plurality of second ends of the breakout/fanout cabling system (with cabling that connects each of the optics devices 404 to the optics device 402). For example, a 4×10 G breakout/fanout cabling system provides a 40 Gbps optics device on one end, and four 10 Gbps optics device connected to the 40 Gbps optics device by cabling. Such optics device systems will benefit from the teachings of the present disclosure and thus will fall within its scope. As such, the embodiment illustrated in FIG. 4 may be characterized as illustrating one of a plurality of similar optics devices 404 that are connected to the optics device 402 through the cable 406.

In the embodiments discussed below, the optics device 402 includes an unprogrammed or corrupted EEPROM such that an optics type for the optics device 402 is not retrievable from its EEPROM. As discussed below, in some embodiments the optics device 404 may include a programmed EEPROM such that an optics type for the optics device 404 is retrievable from its EEPROM, while in other embodiments the optics device 404 may include an unprogrammed or corrupted EEPROM such that an optics type for the optics device 404 is not retrievable from its EEPROM. As discussed below, when the EEPROM of the optics device 404 is programmed such that its optics type can be retrieved, the switch IHS 200 operates to configure the port 210i using that optics type, and the method 300 determines a configuration for the port 210c. In addition, when the EEPROM of the optics device 404 is programmed such that its optics type can be retrieved, the optics device 404 may be connected to the same switch IHS 200 or a different switch IHS than the optics device 402. However, when the when the EEPROM of the optics device 404 is unprogrammed or corrupted such that its optics type cannot be retrieved, the optics device 404 is connected to the same switch IHS 200 as the optics device 402. When the EEPROM of the optics device 404 is unprogrammed or corrupted such that its optics type cannot be retrieved, the method 300 may duplicate any configuration discussed below on each of the ports 210c and 210i.

Thus, at block 302, a user may have connected each of the optics devices 402 and 404 to the ports 210c and 210i, respectively, on the switch IHS 200, with the optics devices 402 and 404 connected to each other using the cable 406. At block 302, the network processing system 206 detects the connection of the optics devices 402 and 404 using methods known in the art. The method 300 then proceeds to decision block 304 where it is determined whether an optics type is available from the optics devices. In an embodiment, at decision block 304, the network processing system 206 accesses the EEPROM in each of the optics devices 402 and 404 and attempts to retrieve an optics type. If, at decision block 304, it is determined that an optics type is available in the EEPROM of an optics device (e.g., in an embodiment where the optics device 404 includes a programmed and uncorrupted EEPROM such that an optics type is retrievable), the method 300 proceeds to block 308 where port(s) are configured based on the optics type. In an embodiment, the network processing system 206 may operate at block 306 to configure the port (e.g., the port 210i) connected to the optics device (e.g., the optics device 404) from which the optics type was retrieved using conventional methods, some of which are described above. In embodiments in which both optics devices 402 and 404 have programmed and uncorrupted EEPROMs such that optics types may be retrieved and their corresponding ports 210c and 210i configured, the link between the ports 210c and 210i will become available and the method 300 may proceed to block 308 where the user is notified that the link is available.

If, at decision block 304, it is determined that an optics type is unavailable in the EEPROM of either of the optics devices (e.g., in the optics device 402, and in some embodiments the optics device 404), the method 300 proceeds to blocks 310-320 where fiber configurations/settings and, in some embodiments, copper configurations/settings are applied to the port 210c and, in some embodiments, the port 210i until the link provided between the ports 210c and 210i by the cable 406 and the optics devices 402 and 404 becomes available. As such, while the discussion of providing configurations/settings to port(s) below is directed to the application of configurations/settings to only the port 210c, that discussion may include the provision of the same configurations/settings to both of the ports 210c and 210i.

There are a variety of configurations and settings that may be applied to ports on the switch IHS 200, and any of those configurations and settings may be stored in the configuration database 208. Fiber configurations may include an SR4 fiber configuration, an ER4 fiber configuration, an LR4 fiber configuration, and/or a variety of other port fiber configurations known in the art. Particular fiber configurations may include a variety of settings for a port that may differ from the settings for other fiber configurations. For example, a port with an ER4 fiber configuration may have its auto-negotiation setting(s) disabled, its SwRXLOS setting(s) enabled, its SR4 interface type setting(s) enabled, and its pre-emphasis setting(s) enabled. In another example, a port with an LR4 fiber configuration may include the same setting(s) as discussed above for the port with the ER4 fiber configuration, but with its high power mode setting(s) enabled. Copper configurations may include a CR4 DAC copper configuration, a CR4 DAC fanout copper configuration, and/or a variety of other copper configurations known in the art. Similarly as with the fiber configurations, particular copper configurations may include a variety of settings for a port that may differ from the settings for other copper configurations. For example, a port with a CR4 DAC copper configuration may have its auto-negotiation setting(s) enabled if a connected port (e.g., the other port providing the link) supports auto-negotiation, its SwRXLOS setting(s) disabled, its CR4 interface type setting(s) enabled, and its pre-emphasis setting(s) enabled. In another example, a port with a CR4 DAC fanout copper configuration may have its Serdes Framer Interface (SFI) interface type setting(s) enabled, and its pre-emphasis setting(s) enabled. While a few examples, have been provided, one of skill in the art in possession of the present disclosure will recognize that a configuration may include any number of settings for a port that provide for proper operation of the port with a connected optics device in order to provide a link.

A variety of settings may be provided on a port, just some of which are discussed below. Speed settings may be provided to configure the data transmission speed of a port. Auto-negotiation settings may be provided to allow a port to select common transmission parameters with a connected port. Medium dependent interface crossover (MDI-X) settings may be provided to allow a port to detect if a link requires a crossover and select a configuration to match a connected port. Interface type settings may be provided to apply predefined configurations to the port and classify the port in a particular category (e.g., ports connected to 40 Gbps fiber optics devices such as SR4, ER4, and LR4 fiber optics devices may utilize interface type SR4, while ports connected to copper optics devices may utilize interface type CR4). Firmware mode settings may be provided along with the port interface type settings, as the two are interrelated. Software receive loss-of signal (SwRXLOS) settings may be provided to handle situations through software when no reliable LOS detect is available, and provides for a receiver reset whenever the link is brought up (SwRXLOS may only be provided on internal PHYs associated with a port coupled to a fiber optics device). Repeater settings, also called synchronous mode operation settings, may be provided to configure the egress of a port to operate synchronously to the media access control (MAC) clock to reduce packet latency. Squelch settings may be provided to bring down a transmitter/receptor (TX/RX) when the clock data recovery (CDR) signal is not locked or when the link status is down. PHY Long XFI settings may be provided when a relatively long cable (5-7 meters) is used with an external PHY device with a 10 Gigabit Small Form Factor Pluggable (XFP) interface (XFI), as XFI cannot drive long distance cables by default and instead needs TX pre-emphasis to be adjusted. Electronic dispersion compensation (EDC) settings may be provided to compensate for intersymbol interference (resulting from high data transmission rates) electrically using high-speed equalizers. Lane Swap and Polarity settings may be provided to ensure link and traffic work. Pre-emphasis settings may be provided to provide emphasis on certain parts of the signal waveform in order to improve waveform quality on XFI/XLAUI/SFI/PPI signals. While a few types of settings are discussed above, one of skill in the art in possession of the present disclosure will recognize that a wide variety of other port settings may be provided on a port and will fall within the scope of the present disclosure, some of which are introduced below.

In an embodiment, the method 300 first proceeds to block 310 where a fiber configuration is applied. In this embodiment, the switch IHS 200 first assumes the optics device is a fiber optics device and applies a fiber configuration to the port 210c in an attempt "bring up" or otherwise make available the link provided between the ports 210c and 210i. For example, in an embodiment of block 310, the network processing system 206 may retrieve an SR4 fiber configuration from the configuration database 208 and apply that SR4 fiber configuration to the port 210c. As discussed above, the SR4 fiber configuration may include a variety of settings for the port 210c that will allow an SR4 fiber optics device to provide an operating link. The method 300 then proceeds to decision block 312 where it is determined whether the link (provided between the ports 210c and 210i) is available. Continuing with the example of first applying the SR4 fiber configuration, the network processing system 206 may determine whether the application of the SR4 fiber configuration to the port 210c resulted in the link becoming available using a variety of different methods. For example, the network processing system 206 may determine that Normal Link Pulse (NLP) signals (e.g., during an idle state) are being exchanged at the ports 210c and 210i and, in response, determine that the link has become available. Similarly, the lack of NLP signal exchange at the ports 210c and 210i may result in a determination that the link is not available. In another example, with ports capable of auto-negotiation, the network processing system 206 may determine that Fast Link Pulse (NLP) signals are being exchanged at the ports 210c and 210i and, in response, determine that the link has become available. Similarly, the lack of FLP signal exchange at the ports 210c and 210i may result in a determination that the link is not available. In another example, the network processing system 206 may include a software development kit (SDK) that includes an application programming interface (API) that allows the network processing system 206 to read the link availability or if the link is not available (e.g., the APIs read the registers in the network processing system 206 to find the link status of MAC and PHY layers and, if both are up, it may be determined that the link is available.

In some embodiments, if the link is not available subsequent to the application of the SR4 fiber configuration to the port 210c, the network processing system 206 may check whether, at the signal level, the link is operating (e.g., in all four lanes of a 40 Gbps port). For example, a 40 Gbps port may include four 10 Gbps lanes, and the network processing system 206 may determine whether any of those lanes are unavailable or "down" using APIs to determine whether signals on those lanes are blocked. If, at decision block 312, it is determined that the link is not available, the method 300 then proceeds to decision block 314 where it is determined whether other fiber configurations are available. In an embodiment, the network processing system 206 checks the configuration database 208 to determine whether other fiber configurations are available.

If, at decision block 312, it is determined that other fiber configurations are available, the method 300 proceeds back through block 310 and decision block 312 where one of those other fiber configurations are applied to the port 210c to determine whether they cause the link to become available. For example, following the application of the SR4 fiber configuration to the port 210c and the subsequent unavailability of the link on a first pass through block 310 and decision block 312, the network processing system 206 may determine at decision block 314 that the ER4 fiber configuration and the LR4 fiber configuration are available in the configuration database 208 and return to block 310. In some embodiments of the second pass through block 310 and decision block 312, the network processing system 206 may retrieve the ER4 fiber configuration from the configuration database 208, apply it to the port 210c, and determine whether the link becomes available. As discussed above, the ER4 fiber configuration may include a variety of settings for the port 210c that will allow an ER4 fiber optics device to provide an operating link. However, in other embodiments of the second pass through block 310 and decision block 312, the network processing system 206 may retrieve the LR4 fiber configuration, apply it to the port 210c, and determine whether the link becomes available (e.g., because the ER4 fiber configuration is sufficiently similar to the SR4 fiber configuration such that unavailability of the link with the SR4 configuration applied indicates that the link will remain unavailable if the ER4 configuration is applied). As discussed above, the LR4 fiber configuration may include a variety of settings for the port 210c that will allow an LR4 fiber optics device to provide an operating link. In embodiments where the ER4 fiber configuration is applied to the port 210c and the link does not become available on the second pass through block 310 and decision block 312, the network processing system 206 may determine at decision block 314 that the LR4 fiber configuration is available in the configuration database 208 and return for a third pass through block 310 and decision block 312 in which the LR4 fiber configuration is applied to the port 210c to determine whether the link becomes available. As such, any number of fiber configurations that are available in the configuration database 208 may be retrieved and applied to the port 210c during the performance of blocks 310-314 of the method 300.

If at decision block 314 it is determined that no other fiber configurations are available, the method 300 then proceeds to block 316 where copper configurations are applied. In this embodiment, following the application of one or more fiber configurations in the configuration database 208 to the port 210c without the link becoming available, the switch IHS 200 now assumes the optics device is a copper optics device and applies copper configurations to the port 210c in an attempt "bring up" or otherwise make available the link provided between the ports 210c and 210i. For example, in an embodiment of block 316, the network processing system 206 may retrieve a CR4 DAC copper configuration from the configuration database 208 and apply that CR4 DAC copper configuration to the port 210c. As discussed above, the CR4 DAC copper configuration may include a variety of settings for the port 210c that will allow an CR4 DAC copper optics device to provide an operating link. The method 300 then proceeds to decision block 318 where it is determined whether the link (provided between the ports 210c and 210i) is available. Continuing with the example of first applying the CR4 DAC copper configuration, the network processing system 206 may determine whether the application of the CR4 DAC copper configuration to the port 210c resulted in the link becoming available using methods similar to those described above. If, at decision block 312, it is determined that the link is not available, the method 300 then proceeds to decision block 320 where it is determined whether other copper configurations are available. In an embodiment, the network processing system 206 checks the configuration database to determine whether any other copper configurations are available.

If, at decision block 320, it is determined that other copper configurations are available, the method 300 proceeds back through block 316 and decision block 318 where those copper configurations are applied to the port 210c to determine whether they cause the link to become available. For example, following the application of the CR4 DAC copper configuration to the port 210c and the subsequent unavailability of the link on a first pass through block 316 and decision block 318, the network processing system 206 may determine at decision block 320 that the CR4 DAC fanout copper configuration is available and return to block 316. In some embodiments of the second pass through block 316 and decision block 320, the network processing system 206 may apply the CR4 DAC fanout copper configuration to the port 210c and determine whether the link becomes available. As discussed above, the CR4 DAC fanout copper configuration may include a variety of settings for the port 210c that will allow an CR4 DAC fanout copper optics device to provide an operating link. If at decision block 320 it is determined that no other copper configurations are available, the method 300 proceeds to block 308 where the user is notified about the link. In this embodiment, none of the fiber configurations and copper configurations that are available in the configuration database 208 resulted in the link becoming available when applied to the port 210c and, as such, at block 308 the user may be notified that the link is unavailable with the optics device 402.

The method 300 may proceed to decision block 322 following the link becoming available in response to either the application of a fiber configuration to the port 210c, or the application of a copper configuration to the port 210c. A link that has become available (e.g., as determined at decision block 312 or decision block 318) may be validated by the network processing system 206 by reading the MAC and PHY level status on both the local and remote ends of the link (e.g., at the ports 210c and 210i). Following the link becoming available in either situation, the port settings associated with the applied configuration may be cross-verified by checking for errors and, if errors are present, provision, modifying, and/or adjusting settings on the ports until the errors are not occurring on the link. In the embodiments discussed below, these errors are discusses as link flap errors (i.e., when the link continually switches between being available and being unavailable) and cyclic redundancy check (CRC) errors, but the provision, modifying, and/or adjustment of other settings to remedy other errors occurring on the link will fall within the scope of the present disclosure.

In some embodiments, the link becomes available at decision block 312 or decision block 318, and at decision block 322 it is determined whether link flap errors exist. In an embodiment, the network processing system 206 may monitor the link that was determined to be available at block 312 to detect link flap errors by monitoring that link to determine whether the link repeatedly becomes available and unavailable (e.g., more than five times in ten seconds). If at decision block 322, link flap errors are determined to exist, the method 300 proceeds to block 324 where link flap errors are corrected. In this embodiment, the network processing system 206 may correct link flap errors by applying SwRXLOS setting(s) (e.g., enabling SxRXLOS) on the port 210c (e.g., via an internal PHY).

Following the correction of link flap errors at block 324, or if no link flap errors are detected at decision block 322, the method 300 then proceeds to block 326 where traffic is provided on the link. In an embodiment, the network processing system 206 may utilize a packet generator at block 326 to generate bidirectional data traffic between the ports 210c and 210i and over the link. The method 300 then proceeds to decision block 328 where it is determined whether CRC errors are detected. In an embodiment, the network processing system 206 may utilize a packet counter to check a frame check sequence (FCS) packet count to determine whether packets transmitted between the ports 210c and 210i have CRC errors. If at decision block 328 it is determined that CRC errors are detected, the method 300 proceeds to block 330 where pre-emphasis settings are adjusted. In an embodiment, the network processing system 206 may adjust the pre-emphasis settings on the port 210c (e.g., the pre values, the post values, and the main values) until the traffic transmitted between the ports 210c and 210i and over the link is free of CRC errors.

Following the adjustment of the pre-emphasis settings at block 330, or if no CRC errors are detected at decision block 328, the method 300 then proceeds to block 308 where the user is notified about the link. In this embodiment, the link is available and any errors that were occurring on the link have been remedied and, as such, at block 308 the user may be notified that the link is available.

Thus, systems and methods have been described that provide for the automatic configuration of a port that is connected to an optics device from which an optics type cannot be retrieved. The systems and methods operate by applying fiber configurations to the port and, if the link associated with the port becomes available in response to the application of one of those fiber configurations, link flap errors may be corrected by enabling a SxRXLOS setting on the port, and CRC errors may be detected by providing traffic on the link and then remedied by adjusting pre-emphasis settings on the port. If none of the applied fiber configurations result in the link becoming available, copper configurations may be applied to the port and, if the link associated with the port becomes available in response to the application of one of those copper configurations, link flap errors and CRC errors may be remedied in similar manners. Upon failure of the link to become available after applying configurations and settings to the port, the configurations and settings on the port may revert back to default configurations and settings such that optics devices that are not compatible with those settings will not be damaged when coupled to the port.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An optics device port configuration system, comprising:
    a switch;
    a first optics device connected to the switch;
    a second optics device connected to the switch; and
    a cable connecting the first optics device and the second optics device to provide a link;
    wherein the switch is configured to:
        determine that an optics type of the first optics device is unavailable;
        apply each of a plurality of fiber optics configurations on the switch until either the link becomes available or each of the plurality of fiber optics configurations have been applied without the link becoming available;
        in response to each of the plurality of fiber optics configurations having been applied without the link becoming available, apply each a plurality of copper optics configurations on the switch until the link becomes available; and
        in response to the link becoming available, provide at least one setting on the switch until errors are not occurring on the link.

2. The optics device configuration system of claim 1, wherein the switch is configured to:
    detect a link flap error occurring on the link and, in response, provide a software receive loss-of-signal setting on the switch.

3. The optics device configuration system of claim 1, wherein the switch is configured to:
    provide bidirectional traffic on the link; and
    monitor the bidirectional traffic to detect errors occurring on the link.

4. The optics device configuration system of claim 1, wherein the switch is configured to:
    detect cyclic redundancy check (CRC) errors occurring on the link and, in response, provide a pre-emphasis setting on the switch.

5. The optics device configuration system of claim 1, wherein the second optics device includes a known optics type.

6. The optics device configuration system of claim 1, wherein the first optics device and the second optics device are the same type of optics device.

7. An information handling system (IHS), comprising:
    a plurality of ports;
    a processing system that is coupled to the plurality of ports;
    a memory system that is coupled to the processing system and that includes instructions that, when executed by the processing system, cause the processing system to:
        detect a first optics device that is coupled to a first port of the plurality of ports and that provides a link between the first port and a second port of the plurality of ports;
        determine that an optics type of the first optics device is unavailable;
        apply each of a plurality of fiber optics configurations to the first port until either the link becomes available or each of the plurality of fiber optics configurations have been applied without the link becoming available;
        in response to each of the plurality of fiber optics configurations having been applied without the link becoming available, apply each a plurality of copper optics configurations to the first port until the link becomes available; and
        in response to the link becoming available, provide at least one setting on the first port until errors are not occurring on the link.

8. The IHS of claim 7, wherein the memory system includes instructions that, when executed by the processing system, cause the processing system to:
    detect a link flap error occurring on the link and, in response, provide a software receive loss-of-signal setting on the first port.

9. The IHS of claim 7, wherein the memory system includes instructions that, when executed by the processing system, cause the processing system to:

provide bidirectional traffic on the link; and monitor the bidirectional traffic to detect errors occurring on the link.

10. The IHS of claim 7, wherein the memory system includes instructions that, when executed by the processing system, cause the processing system to:

detect cyclic redundancy check (CRC) errors occurring on the link and, in response, provide a pre-emphasis setting on the first port.

11. The IHS of claim 7, wherein the memory system includes instructions that, when executed by the processing system, cause the processing system to:

detect a second optics device that is coupled to the second port and that provides the link between the first port and a second port, wherein the second optics device includes a known optics type.

12. The IHS of claim 7, wherein the memory system includes instructions that, when executed by the processing system, cause the processing system to:

detect a second optics device that is coupled to the second port and that provides the link between the first port and a second port, wherein the first optics device and the second optics device are the same type of optics device.

13. The IHS of claim 12, wherein the memory system includes instructions that, when executed by the processing system, cause the processing system to:

apply each of the plurality of fiber optics configurations to the second port as well as the first port until either the link becomes available or each of the plurality of fiber optics configurations have been applied without the link becoming available;

in response to each of the plurality of fiber optics configurations having been applied without the link becoming available, apply each the plurality of copper optics configurations to the second port as well as the first port until the link becomes available;

in response to the link becoming available, provide at least one setting on the second port as well as the first port until errors are not occurring on the link.

14. A method for providing a configuration for an optics device, comprising:

detecting, by an information handling system (IHS), a first optics device that is coupled to a first port and that provides a link between the first port and a second port;

determining, by the IHS, that an optics type of the first optics device is unavailable;

applying, by the IHS, each of a plurality of fiber optics configurations to the first port until either the link becomes available or each of the plurality of fiber optics configurations have been applied without the link becoming available;

in response to each of the plurality of fiber optics configurations having been applied without the link becoming available, applying, by the IHS, each a plurality of copper optics configurations to the first port until the link becomes available; and in response to the link becoming available, providing, by the IHS, at least one setting on the first port until errors are not occurring on the link.

15. The method of claim 14, further comprising:

detecting, by the IHS, a link flap error occurring on the link and, in response, provide a software receive loss-of-signal setting on the first port.

16. The method of claim 14, further comprising:

providing, by the IHS, bidirectional traffic on the link; and monitoring, by the IHS, the bidirectional traffic to detect errors occurring on the link.

17. The method of claim 14, further comprising:

detecting, by the IHS, cyclic redundancy check (CRC) errors occurring on the link and, in response, providing, by the IHS, a pre-emphasis setting on the first port.

18. The method of claim 14, further comprising:

detecting, by the IHS, a second optics device that is coupled to the second port and that provides the link between the first port and a second port, wherein the second optics device includes a known optics type.

19. The method of claim 14, further comprising:

detecting, by the IHS, a second optics device that is coupled to the second port and that provides the link between the first port and a second port, wherein the first optics device and the second optics device are the same type of optics device.

20. The method of claim 19, further comprising:

applying, by the IHS, each of the plurality of fiber optics configurations to the second port as well as the first port until either the link becomes available or each of the plurality of fiber optics configurations have been applied without the link becoming available;

in response to each of the plurality of fiber optics configurations having been applied without the link becoming available, applying, by the IHS, each the plurality of copper optics configurations to the second port as well as the first port until the link becomes available;

in response to the link becoming available, providing, by the IHS, at least one setting on the second port as well as the first port until errors are not occurring on the link.

\* \* \* \* \*